United States Patent
He et al.

(10) Patent No.: US 11,003,428 B2
(45) Date of Patent: May 11, 2021

(54) SAMPLE DRIVEN PROFILE GUIDED OPTIMIZATION WITH PRECISE CORRELATION

(71) Applicant: MICROSOFT TECHNOLGY LICENSING, LLC., Redmond, WA (US)

(72) Inventors: Wenlei He, Sammamish, WA (US); Ten Tzen, Sammamish, WA (US); Pratap Joseph Chandar, Snohomish, WA (US)

(73) Assignee: MICROSOFT TECHNOLGY LICENSING, LLC., Redmond, WA (US)

( * ) Notice: Subject to any disclaimer, the term of this patent is extended or adjusted under 35 U.S.C. 154(b) by 48 days.

(21) Appl. No.: 15/163,684

(22) Filed: May 25, 2016

(65) Prior Publication Data
US 2017/0344349 A1    Nov. 30, 2017

(51) Int. Cl.
G06F 9/44       (2018.01)
G06F 8/41       (2018.01)
G06F 11/34      (2006.01)

(52) U.S. Cl.
CPC .......... *G06F 8/443* (2013.01); *G06F 11/3466* (2013.01)

(58) Field of Classification Search
CPC ..... G06F 1/3624; G06F 1/3636; G06F 1/0715
See application file for complete search history.

(56) References Cited

U.S. PATENT DOCUMENTS 6,275,981 B1   8/2001  Buzbee et al.
6,374,367 B1   4/2002  Dean et al.
6,971,091 B1   11/2005 Arnold et al.
(Continued)

FOREIGN PATENT DOCUMENTS

EP    0689141 A2    12/1995

OTHER PUBLICATIONS

Dean, et al., "ProfileMe: Hardware Support for Instruction-Level Profiling on Out-of-Order Processors", In Proceedings of 30th annual ACM/IEEE international symposium on Microarchitecture, Dec. 1, 1997, pp. 292-302.
(Continued)

*Primary Examiner* — Hang Pan
*Assistant Examiner* — Lenin Paulino

(57) ABSTRACT

A profile guided optimization compiler utilizes sample profile data including a control flow representation of a program having block counts associated with each basic block of the program, and edge counts associated with each control flow edge estimated from the block counts. The sample profile data utilizes correlation data to map the address of a sampled instruction from a fully optimized binary directly into a corresponding basic block of source code control flow of the program using a relative virtual address (RVA) that is associated with each source code basic block and the sampled instruction. The correlation data is able to differentiate multiple blocks on the same source code line and handle inlining and optimizations with greater precision and efficiency. The block counts are then used to guide the optimization of the program.

19 Claims, 10 Drawing Sheets

(56) References Cited

U.S. PATENT DOCUMENTS

| | | | | |
|---|---|---|---|---|
| 7,721,274 | B1* | 5/2010 | Panchenko | G06F 9/44521 717/153 |
| 7,827,543 | B1 | 11/2010 | Kosche et al. | |
| 8,176,475 | B2 | 5/2012 | Kosche et al. | |
| 8,387,026 | B1 | 2/2013 | Hundt et al. | |
| 8,423,980 | B1 | 4/2013 | Ramasamy et al. | |
| 8,566,559 | B2 | 10/2013 | Schmich et al. | |
| 2004/0015927 | A1* | 1/2004 | Haber | G06F 8/443 717/155 |
| 2007/0079294 | A1 | 4/2007 | Knight et al. | |
| 2007/0106981 | A1* | 5/2007 | Bird | G06F 21/566 717/127 |
| 2007/0150866 | A1* | 6/2007 | Bates | G06F 11/3624 717/124 |
| 2008/0040710 | A1* | 2/2008 | Chiriac | G06F 21/566 717/136 |
| 2009/0055813 | A1* | 2/2009 | Haber | G06F 8/4441 717/158 |
| 2009/0094590 | A1 | 4/2009 | Mendelson et al. | |
| 2016/0139887 | A1* | 5/2016 | Pudiyapura | G06F 8/447 717/106 |
| 2016/0300063 | A1* | 10/2016 | Daymont | G06F 21/566 |

OTHER PUBLICATIONS

McFarling, Scott, "Program Optimization for Instruction Caches", In Proceedings of Third International Conference on Architectural Support for Programming Languages and Operating Systems, Apr. 3, 1989, pp. 183-191.

Pettis, et al., "Profile Guided Code Positioning", In Proceedings of ACM SIGPLAN Conference on Programming Language Design and Implementation, Jun. 20, 1990, pp. 16-27.

Zhang, et al., "System Support for Automatic Profiling and Optimization", In Proceedings of sixteenth ACM symposium on Operating systems principles, Oct. 5, 1997, pp. 15-26.

Dean, et al., "Vortex: An Optimizing Compiler for Object-Oriented Languages", In Proceedings of 11th ACM SIGPLAN Conference on Object-Oriented Programming, Systems, Languages, and Applications, Oct. 6, 1996, pp. 83-100.

Chen, et al., "Taming Hardware Event Samples for FDO Compilation", In Proceedings of 8th annual IEEE/ACM international symposium on Code generation and optimization, Apr. 24, 2010, pp. 42-52.

Wicht, et al., "Hardware Counted Profile-Guided Optimization", In Journal of Computing Research Repository, Nov. 2014, pp. 1-10.

"International Search Report and Written Opinion Issued in PCT Application No. PCT/US2017/032990", dated Jul. 14, 2017, 15 Pages.

* cited by examiner

SAMPLE DRIVEN PROFILE GUIDED OPTIMIZATION WITH PRECISE CORRELATION

BACKGROUND

Field

The present embodiments relate to techniques for compiling software programs for execution on computing systems and more particularly, to methods, devices, and systems that create profile data based on sampled instructions for use in profile guided optimization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Compiler optimizations are used to generate executable code that runs efficiently and makes efficient use of resources. These optimizations benefit from the knowledge of how the program will execute with production inputs. Profile guided optimization obtains information or profile data generated from sample runs of the program to guide the compiler in performing optimizations that better suit a target environment. This profile data can include a count of the number of times instructions associated with a basic block are executed. In this manner, the compiler can optimize the more frequently executed areas of the program more aggressively than less frequently executed areas.

In order to correlate the counts with the source code, correlation data is generated which maps a processor instruction sampled from a sample run with a basic block associated with the source code corresponding to the processor instruction. The correlation data includes a control flow representation for each function of the program which identifies the basic blocks of the function. Each basic block contains a range of relative virtual addresses corresponding to instructions associated with the basic block in the source code control flow. The block count from the sample run is then used to update the block count of the corresponding basic block. The correlation data with the block counts is then considered the sample profile data which is then used to derive edge counts which are used to determine the optimizations to perform on certain portions of the program and the degree of optimization.

A user may visualize the sample profile data, edit the source code, run additional sample runs to obtain more block counts, and recompile the program, iteratively in any sequence, in order to obtain the desired level of optimization for an intended use.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

Figure 1:
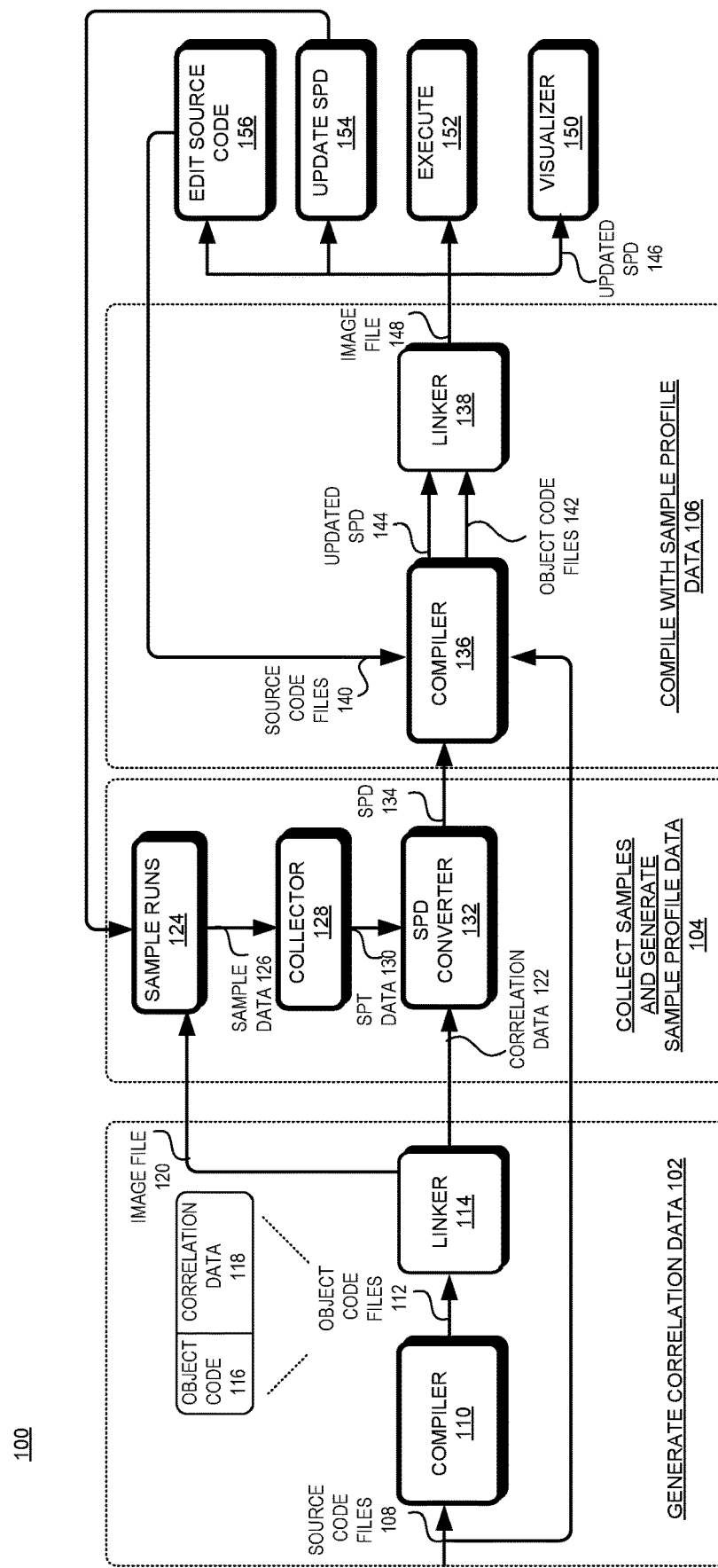
FIG. 1 illustrates an exemplary system for optimizing a software program utilizing sample driven profile guided optimization.

A compiler typically performs code optimizations in order to generate code that executes faster and uses memory efficiently. These code optimizations can include inlining, code hoisting, dead storage elimination, eliminating common sub-expression, loop unrolling, code motion, induction variable elimination, reduction in strength, and so forth. A traditional compiler performs these code optimizations based on static source code files without knowledge of the input that will be used at runtime which cannot be obtained from the static source code files.

Profile guided optimization (PGO) is a technique that uses information generated from sample runs of a program to guide the compiler in performing optimizations to better suit the intended target environment. The information collected during the sample runs is referred to as profile data. The sample runs can be based on test scenarios with real word inputs. With the profile data based on real-world inputs, the compiler can be guided to decide which optimizations are best suited for the target environment and how to perform the optimizations. For example, the knowledge of which sections of the program are most heavily executed allows the compiler to optimize the more heavily executed sections than those areas of the program that are used less frequently.

Instrumentation PGO is one type of PGO technique. In this technique, probes or special instructions are inserted into a binary representation of the program. The probes are used to collect information during execution of the program. The instrumented binary is then compiled to form an instrumented executable that is run with test input. The profile data resulting from these sample runs is then used in a subsequent compilation of the program, without the instrumented code, to optimize the program. However, instrumentation-based PGO requires that modifications be made to the program in order to instrument the program to collect the profile data. The additional code in the instrumented program increases the execution time of the program and alters the quality of the profile data.

Hardware-event sampling is another PGO technique that has the advantage of not requiring any modifications to the program. Certain processors have hardware performance counters that are used to count events or actions that occur during the operation of the processor. For example, some processors include counters for counting memory accesses, cache misses, instructions that are executed, instructions that are not executed, branch mis-predictions, clock cycles and so forth. A performance monitoring unit (PMU) is often coupled to a processor and used to read a counter when the counter overflows. The PMU generates an interrupt to the program when the counter overflows and records the address of currently executed instruction and the value of one or more counters. However, there needs to be a way to map the address of the sampled instruction to its corresponding source location in order for the information from the counters to be of use for the compiler's optimization.

The subject matter disclosed herein overcomes this limitation by generating correlation data that maps the address of the sampled instruction to a basic block of the program. This mapping utilizes a relative virtual address (RVA) range that is associated with each basic block and the sampled instruction. In this manner, the count associated with the sampled instruction can be added to the block count of its corresponding basic block. The block counts are then used to derive edge counts and identify which areas in the program are more heavily traveled than other less frequently used areas. This information is crucial for the compiler in optimizing the program for faster execution with efficient memory usage.

The correlation data includes a control flow representation of each function of the program along with a block-to-RVA map. The block-to-RVA map identifies ranges of RVAs that are associated with a particular basic block. The identity of the basic blocks in a program is not known until the compiler performs control flow analysis. The intermediate code representation (IR) statements used by the compiler are not associated with an address. Before code linkage, the compiler generates an offset for each IR statement that is relative to a position within a function. This offset is part of the range of offsets associated with a basic block. At link time, the start RVA of a function is known so the linker replaces the offset with a relative virtual address that is based from the start RVA of its associated function.

The present technique has several benefits over prior solutions. The correlation data is more precise since the correlation data is generated on compiler generated code with a direct mapping from the compiler generated code to the basic block in the source code control flow representation, rather than relying on source code line number information.

The correlation data is more efficient since there is a direct mapping from a hardware instruction to a block through the RVA. This is more efficient than other techniques that may utilize debugging information to map to a line of source code since it is a direct mapping that does not rely on intermediate references, such as debugging information.

In addition, mapping to a basic block produces a more accurate block count since multiple basic blocks may be associated with a line of source code. Compiler optimizations change the code such that the instructions are spread out and may belong to different disjoint RVA ranges. This is attributable to optimizations such as control flow optimization and code duplication that move the instructions to multiple areas in the program or in the case of macro expansion in the source code. Mapping to a source code line number fails to differentiate multiple blocks that utilize a particular source code statement.

In addition, the mapping (e.g., SPD file) allows the compiler to store hints about how the raw sampled counts should be adjusted in the control flow representation of the correlation data. A hint can be based on how an optimization transformed the program and can be used later to more accurately recover from the count any inconsistencies from the sampling.

Sample Driven Profile Guided Optimization with Precise Correlation

Attention now turns to FIG. 1 which illustrates an exemplary system and process 100 configured for sample driven profile guided optimization. FIG. 1 shows an exemplary configuration of a system that generates the correlation data 102, collects samples to generate the sample profile data 104, and compiles the program with the sample profile data 106. Initially, correlation data 122 is generated from an initial compilation (compiler 110) of the program. As each source code file 108 of a program is compiled, a corresponding object file 112 is generated which includes object code 116 and correlation data 118. The correlation data 118 includes a control flow representation for each function of the source code 108 along with a block-to-offset map for each basic block in the control flow. The object code files 112 are then linked (linker 114) and a corresponding image file 120 or executable is generated. The linker 114 updates the correlation data 122 with the relative virtual addresses (i.e., virtual addresses) associated with each basic block that is based from the start RVA of its associated function.

Next, the image file 120 is executed during one or more sample runs 124 using various inputs and outputs hardware instruction traces from each sample run 124. The hardware instruction traces or sample data 126 from the multiple sample runs 124 are collected and formatted into sample profile trace ("SPT") data 130 by collector 128. The SPT data 130 contains a series of opcode, RVA, and count triplets associated with the sampled instructions. The SPT data 130 is then correlated with the correlation data 122 to generate a sample program data ("SPD") file 134.

The SPD file 134 includes the correlation data with block counts. A block count represents the number of times the hardware instructions of a basic block are executed. The block count is based on the counts from the instruction traces. The SPD file 134 is then used in a subsequent profile optimization compilation (compiler 136) of the source code files 108, 140. This compilation also updates the data in the SPD file 134 generating an updated SPD 144. The updated SPD 144 contains correlation data that reflects the current source code and also contains counts carried over from the input SPD for functions that have not been edited. The linker 138 receives the object code files 142 and the updated SPD file 144 from this compilation and forms an image file 148 suitable for execution (block 152).

Although FIG. 1 depicts the system and process in a particular configuration, it should be noted that the developer is able to alter the steps shown in FIG. 1 in any intended manner. For example, a developer may update the SPD file (block 154) with additional sample runs using different inputs. In one aspect, the SPD file may be a rolling profile where counts expire over time when additional sample data is generated. For example, the block counts may be weighted by date and the older counts may be retired when more recent sample data is generated. Alternatively, the existing block counts may be discarded and replaced with the counts from the new sample data. Block counts that are older than a predetermined threshold may be discarded and replaced with the counts from the new sample data. A weight can be associated with the sample data based on a time the sample data is obtained and a block count may be based on a weighted average of the counts.

In addition, the developer may edit the source code (block 156) which may be re-optimized using the SPD file 134 having the additional inputs. In addition, the developer may visualize the SPD file 146 (block 150) for further analysis and then update the SPD file (block 154) with additional sample runs. The system is not constrained to any particular sequence of actions and is configured so that the developer may repeatedly generate a SPD file, optimize the program with a specific version of the SPD, execute the program, visualize the SPD file, edit the source code, and re-optimized the program in any intended manner.

Figure 2:
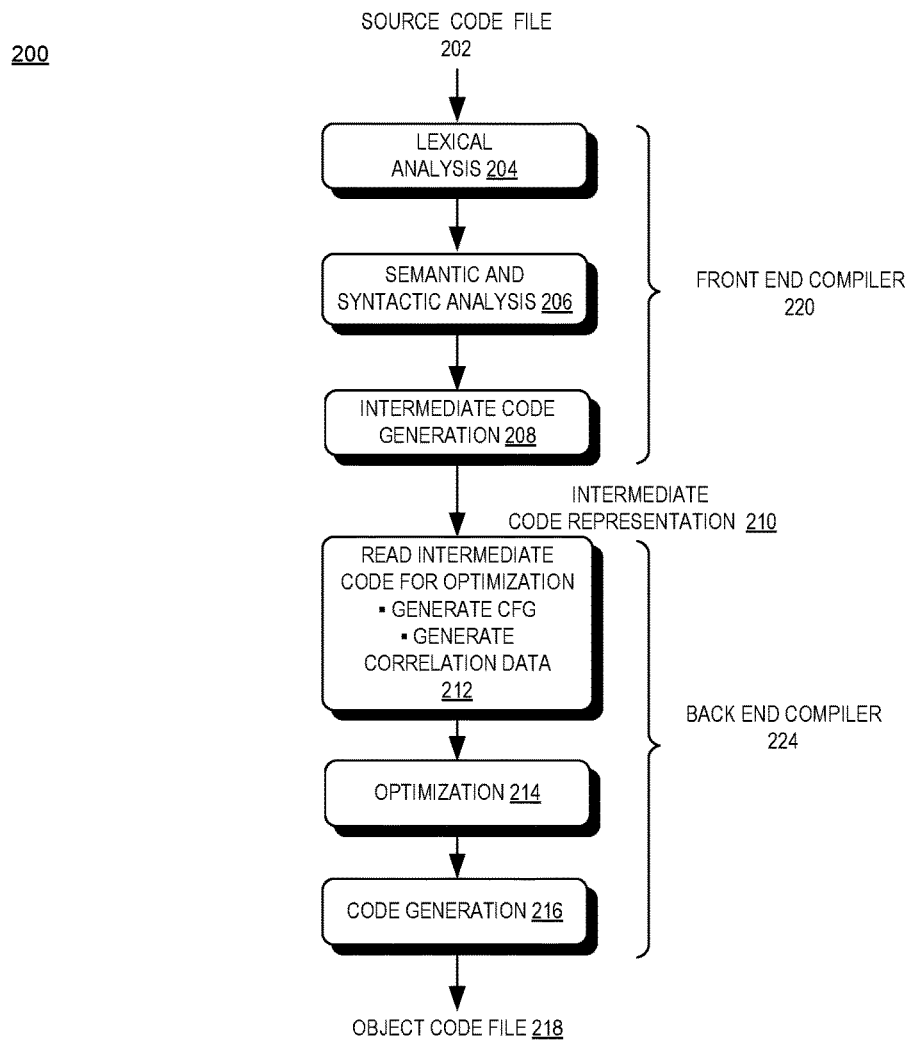
FIG. 2 is a flow diagram illustrating an exemplary method for performing a compilation to generate the correlation data.

Attention now turns to a further discussion of the compilation shown in FIG. 1 (compiler 110) which is used to generate the correlation data and object files. Turning to FIG. 2, there is shown an exemplary method 200 for compiling each source code file 202 of a program. It should be noted that the method 200 may be representative of some or all of the operations executed by one or more aspects described herein and that the method can include more or less operations than that which is described in FIG. 2.

Compilation is the process of transforming source code into executable code. In one aspect, the compilation is performed in two phases by a front end compiler 220 and a back end compiler 224. The front end compiler 220 transforms the source code file 202 into an intermediate code representation 210 and the back end compiler 224 transforms the intermediate code representation 210 into an executable, such as an object file 218.

As shown in FIG. 2, the front end compiler 220 may operate in phases which include lexical analysis (block 204), semantic and syntactic analysis (block 206) and intermediate code generation (block 208). Lexical analysis (block 204) analyzes a stream of characters into tokens. Syntactic analysis (block 206) or parsing takes the tokens and checks if the arrangement of tokens adheres to the grammar of the underlying programming language. The syntactic analysis (block 206) outputs a parse tree or syntax tree. Semantic analysis (block 206) checks the parse tree for semantic correctness, such as performing type checking and checking if the number of arguments in a function call is correct, and the like. Intermediate code generation (block 208) generates the intermediate code representation which is a machine and language independent version of the source code. The intermediate code representation may be represented in bytecodes, common intermediate language ("CIL"), GNU register transfer language ("GNU RTL"), parse tree, tree representation, or any other type of data structure or format used by a compiler or language virtual machine.

The back end compiler 224 receives the intermediate code representation 210 and scans this code to generate a control flow representation for each function in the program. A control flow representation is a data structure abstracting the control flow behavior of a function. A function is a group of source code statements that performs a specific task. A function can be from a built-in library of functions or user-defined in the source code. The control flow representation is a data structure that represents the flow through a program by grouping the IR statements into basic blocks where each basic block contains sequentially-ordered IR statements that have only one entry point and only one exit point. The basic blocks in a control flow representation represent a sequence of instructions with a single entry and a single exit point and, the edges connecting the basic blocks represent the flow of control within a function from one basic block to another basic block.

The back end compiler 224 also generates the correlation data which includes a control flow representation of a function and a block-to-offset map. The block-to-offset map associates each basic block of a function with a range of offsets. Each offset is associated with an instruction that is part of the basic block and is relative to the start of the function.

The back end compiler 224 then performs various optimizations on the intermediate code representation 210 which may include one or more of the following, without limitation: inlining; code hoisting; dead code elimination; eliminating common sub-expression; loop unrolling; induction variable elimination; reduction in strength; and so forth. Inlining expands the body of a function with the source code of the function in order to eliminate the overhead associated with calling and returning from the function. Code hoisting moves loop-invariant source code statements out of a loop so that the statement is only executed once rather than at each loop iteration. Dead code elimination refers to eliminating code that is unreachable or is not executed. Common sub-expression elimination refers to eliminating an expression that was previously computed and where the values of the expression have not changed since the previous computation. Loop unrolling reduces the number of iterations in a loop by replicating the source code of the body of the loop. Induction variable elimination combines multiple induction variables into a single induction variable. Reduction in strength replaces a computationally intensive operation with a less computationally intensive operation. It should be noted that the aspects of the invention described herein are not limited to the foregoing compiler optimizations. Other compiler optimizations may be utilized as well and the optimization described herein are not intended to suggest any limitation to the functionality of the aspects.

The final phase of the compilation is the code generation phase (block 216). The back end compiler 224 assigns variables to registers (i.e., register allocation) and generates machine instructions for the target processing unit that is output to an object code file 218. In one aspect, the object code file 218 includes the object code and correlation data. This combined object code file and correlation data 218 is sent to a linker for further processing.

Figure 3:
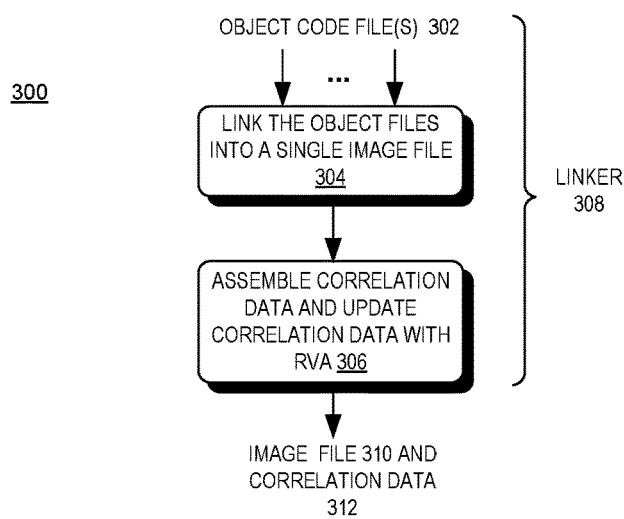
FIG. 3 is a flow diagram illustrating an exemplary method for linking object files into an image file and updating the correlation data with relative virtual addresses.

Turning to FIG. 3, there is shown in further detail the actions of the linker 114 of FIG. 1. A linker 308 receives each of the object code files 302 and links them into a single executable or image file 310 (block 304). The linker 308 assembles the correlation data in each of the object files into a single correlation data file 312 (block 306). The linker 308 replaces the offset ranges in each function's basic block with RVA ranges (block 306). Alternatively, the start RVA of each function may be stored in the SPD. The RVA ranges are relative to the start RVA for the corresponding function.

Attention now turns back to FIG. 1 for a more detailed description of the manner in which the sample profile data is generated. The image file 120 is executed with real world inputs representing different scenarios in various sample runs 124 to generate sample data 126. During the execution of each sample run 124, samples of hardware instructions (i.e., sample data 126) are generated. There are various performance monitoring tools that can be used to generate the sample data 126, such as without limitation, Microsoft's xperf, Intel's Vtune, Oracle's Hardware Activity Reporter (HAR), Event Tracing for Windows (ETW), and the like. The format of the data that is output from these different performance monitoring tools differs. The collector 128 receives the sample data 126 in the different formats and converts them into a uniform format, Sample Data Trace ("SPT") format. The SPT format includes, at least, an opcode, a RVA, and a count. The SPT data 130 is then used by the SPD converter 132 to generate the SPD 134 along with the correlation data 122.

Figure 4:
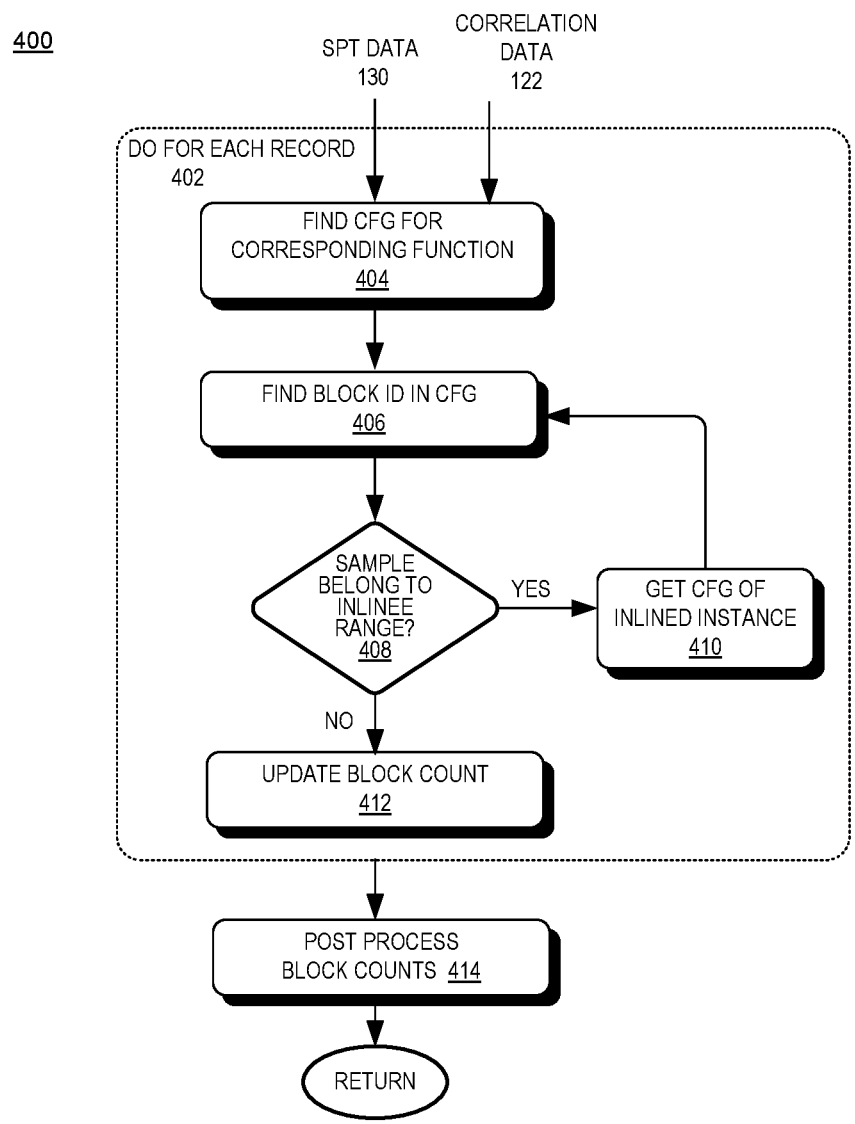
FIG. 4 is a block diagram illustrating an exemplary method for generating the sample profile data with block and edge counts.

Attention now turns to FIG. 4 which illustrates an exemplary method 400 of the SPD converter 132. The SPD converter 132 receives the SPT data 130 and the correlation data 122. The correlation data 122 is an SPD file without block counts. The SPD converter 132 reads each SPT record (block 402) and searches for a control flow representation in the correlation data 122 that matches the SPT record (block 404). This is done by matching the RVA in the SPT record with a control flow representation having a RVA range that includes the RVA in the SPT record (block 404). The corresponding block identifier is found based on the RVA in the SPT record being within the RVA range of the matching block (block 406).

The SPD converter 132 then determines if the RVA range of the sample includes an inlinee. The correlation data includes the block-to-RVA map of each inlined function, one map for each inlined instance. If so (block 408—yes), the linee's control flow representation is found in the correlation data (block 410) and the process continues (block 406) to search the inlinee's control flow representation until it reaches a block that does not have an inlinee (block 408—no). Once found (block 408—no), the block count for the block is updated with the count from the SPT record (block 412). If the sample does not belong to an inline range (block 408—no), then the block count for the block is updated with the count from the SPT record (block 412). This process is repeated until all the SPT records are processed (block 402).

Once all the SPT records are processed, the block counts for each block is post-processed and then used to estimate edge counts (block 414). An edge count is the number of times an edge into (i.e., incoming edge) or out (i.e., outgoing edge) of a basic block of a control flow representation is traveled or executed. An incoming edge count of a block is the number of times execution transferred from the source block of the edge (i.e. a predecessor block) to the basic block and an outgoing edge count of a basic block is the number of times execution transferred from the basic block to the sink block of the edge (i.e. a successor block). Ideally, the count of all incoming edges of a basic block should equal the count of all outgoing edges for that block. The post processing heuristically adjusts the block counts and edge counts so that the block counts and edge counts meet the flow conservation rule, that is the sum of incoming edges' count equals the sum of outgoing edges' count for each basic block. For example, this post processing can alter an edge count to be the average of the incoming edge count and the outgoing edge count. However, it should be noted that the technology described herein is not constrained to this particular heuristic and that other heuristics may be employed.

Figure 5:
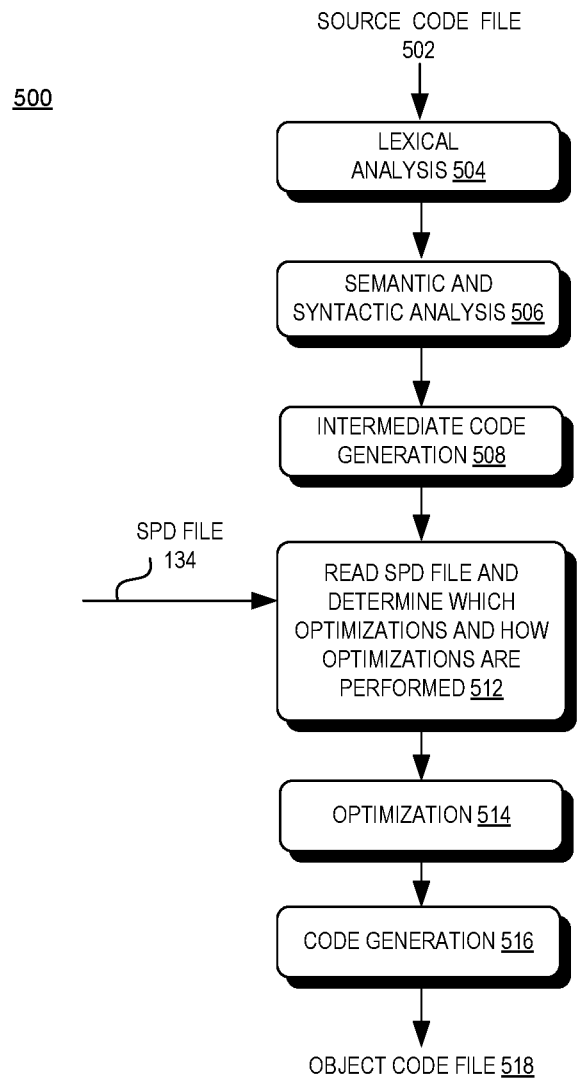
FIG. 5 is a block diagram illustrating an exemplary method for optimizing a program with the SPD file.

Returning to FIG. 1, once the SPD file 134 is generated, each source code file of the program is compiled using the SPD file to optimize the program. This is described more in FIG. 5. The compilation 500 may be performed by a single compiler or using a front end and back end compiler and is considered a profile optimization compiler 136 since it utilizes the SPD file 134. The compilation may be performed in multiple phases including a lexical analysis phase (block 504), a semantic and syntactic analysis phase (block 506), an intermediate code generation phase (block 508) as described previously. The intermediate code generation phase (block 508) generates an intermediate code representation of the source code. The optimization phase (block 514) performs the code optimizations and the code generation phase (block 516) generates the object code file 518.

Prior to the optimization phase, the compiler analyzes the SPD file 134 to determine which code optimizations to perform on which areas of the program (block 512). For example, the compiler may determine which functions of the program, and which blocks of a function are executed more frequently which require more optimizations. The block counts may be used to determine which functions of the program should be inlined. The code layout may be optimized by placing the more frequently executed code together and the less frequently code together.

Turning back to FIG. 1, attention now turns to updating the SPD (block 154). A user may, at any time, want to create a new SPD file with different sample data or add additional sample data to an existing SPD file. In either situation, the SPD file may be updated accordingly. Additional sample runs may be performed (block 124) that generate new sample data 126 that the collector 128 formats into SPT data 130. The SPD generator 132 may either merge the new SPT data with correlation data to create a new SPD file or merge the new SPT data with an existing SPD file. Additionally, a user may, at any time, edit the source code of the program (block 156) and recompile the program to further optimize the program (block 136).

Figure 6A:
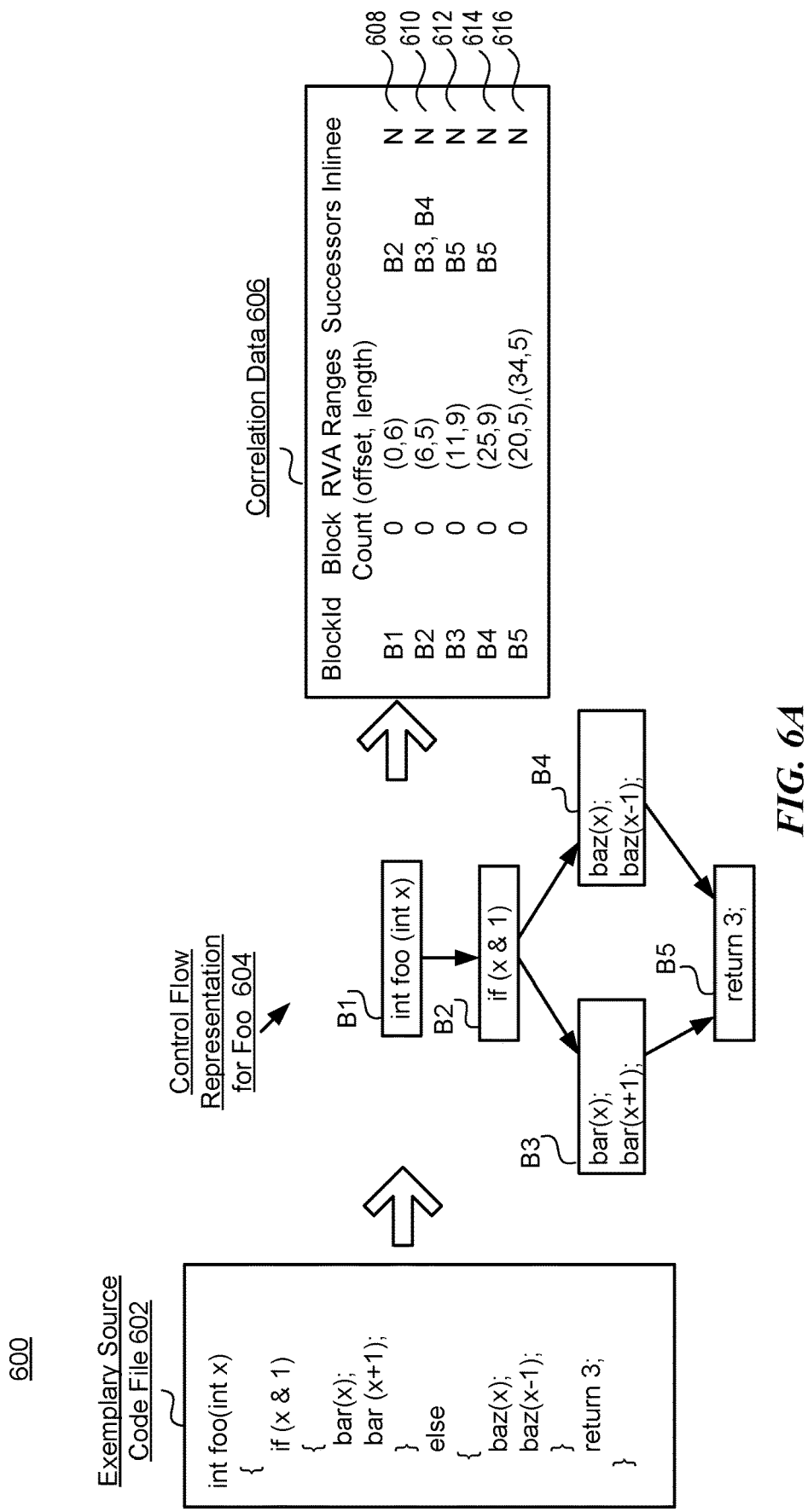
FIGS. 6A-6D illustrate an example of generating the sample profile data for an exemplary program.

Attention now turns to FIGS. 6A-6D which illustrates the creation of the SPD file for an exemplary program. Turning to FIG. 6A, there is shown an exemplary system and process 600 having an exemplary source code listing 602 for the function foo( ) before the initial compilation and linkage. There is shown an illustration of a control flow representation 604 for the function foo( ). The control flow representation 604 includes five basic blocks labeled B1-B5. Basic block B1 represents the code statement int foo (int x) or the function prolog, basic block B2 represents the code statement if (x&1), basic block B3 represents the code statements bar(x); bar(x+1); basic block B4 represents code statements baz(x); baz(x−1); and basic block B5 represents code statement return 3.

The correlation data 606 for the function foo( ) is shown as a table that includes a separate entry for each basic block, 608, 610, 612, 614, 616. Each entry includes a unique block identifier for each basic block in the function foo( ) a block count, one or more RVA ranges where each RVA range includes a start offset and a length, a successors field which denotes the basic blocks that follow, and an inlinee field that denotes whether the function has inlined code. As shown in FIG. 6A, the correlation data 606 has no block counts (i.e., block count=0) or inlined code (inline=N).

Figure 6B:
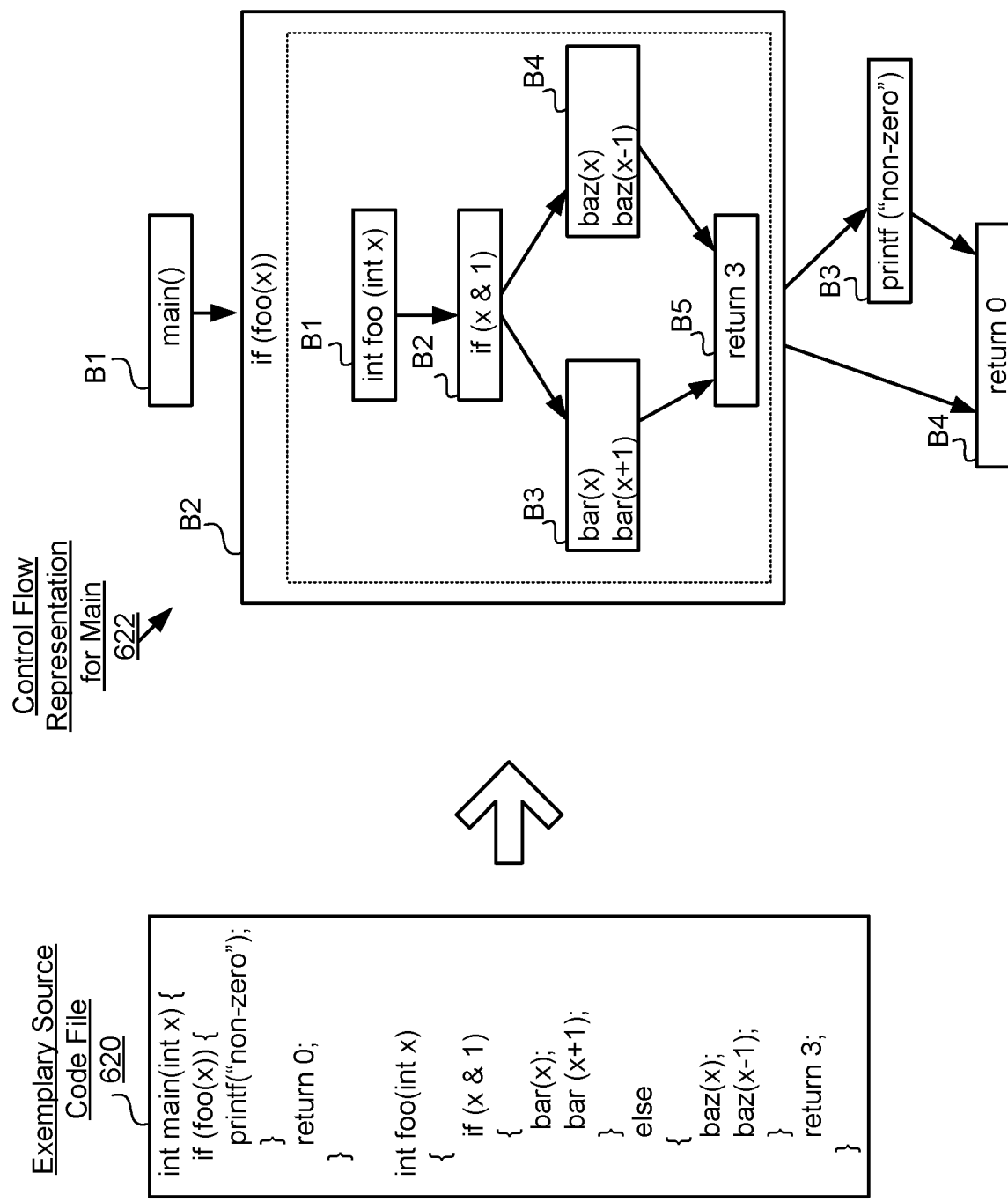

FIG. 6B shows a second exemplary source code program 620 including the function main( ) which inlines the function foo( ) shown in FIG. 6A. The corresponding control flow representation 622 includes four basic blocks labeled B1-B4. Basic block B1 represents the code statement main( ), basic block B2 represents the code statement if foo(x) with the control flow representation for the function foo( ) inlined, basic block B3 represents the code statement printf ("non-zero") and basic block B4 represents the code statement return 0.

Figure 6C:
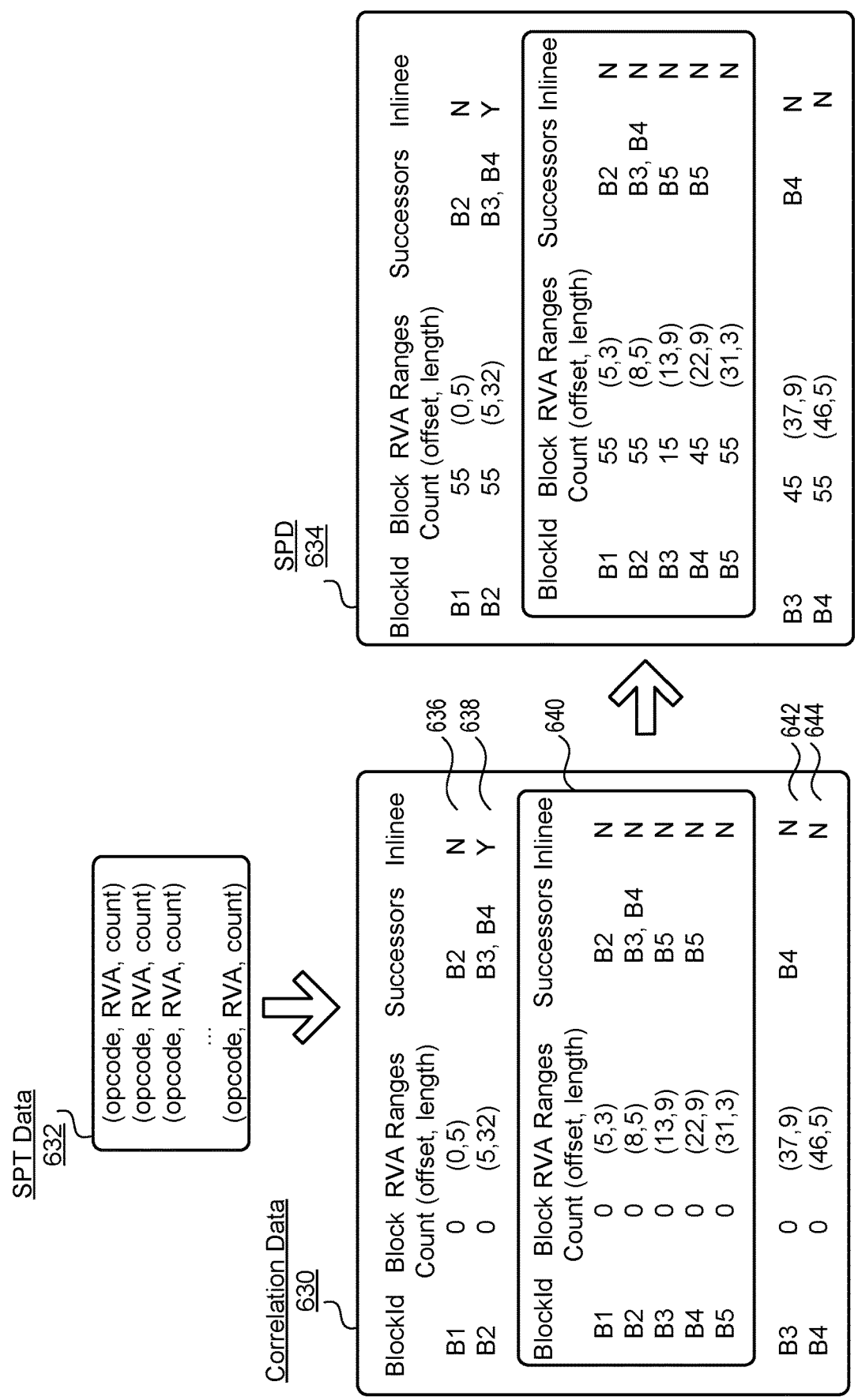

FIG. 6C illustrates the correlation data 630 for the second exemplary source code program 620 main( ) shown in FIG. 6B. The correlation data 630 for the function main( ) is shown as a table that includes a separate entry for each basic block B1-B4 in main ( ) 636, 638, 642, 644. The correlation data 630 for main( )'s basic block B2 includes the correlation data 606 for foo( ). The inline field for B2 of main( ) indicates that B2 has an inlined function (i.e., inline=Y) and includes the correlation data for foo( ) 640. It should be noted that the correlation data is a hierarchical table where a basic block includes the correlation data for all inlined functions. For example, if foo( ) were to include inlined code for baz( ), then the correlation data for baz( ) would be part of the correlation table for foo( ).

FIG. 6C also shows the SPT data 632. The SPD converter 132 obtains the SPT data 632 and merges the counts in the SPT data 632 with the block counts of the corresponding basic block in the correlation data 630. As noted above, the basic block corresponding to the SPT data record has a range of RVAs that match the RVA in the SPT data record. The block counts in the correlation data 630 are zero. However, after the SPT data 632 is merged into the correlation data 630, the block counts appear in the correlation data thereby generating the SPD file 634. The SPD file 634 includes the correlation data 630 and the block counts from the SPT data 632.

Figure 6D:
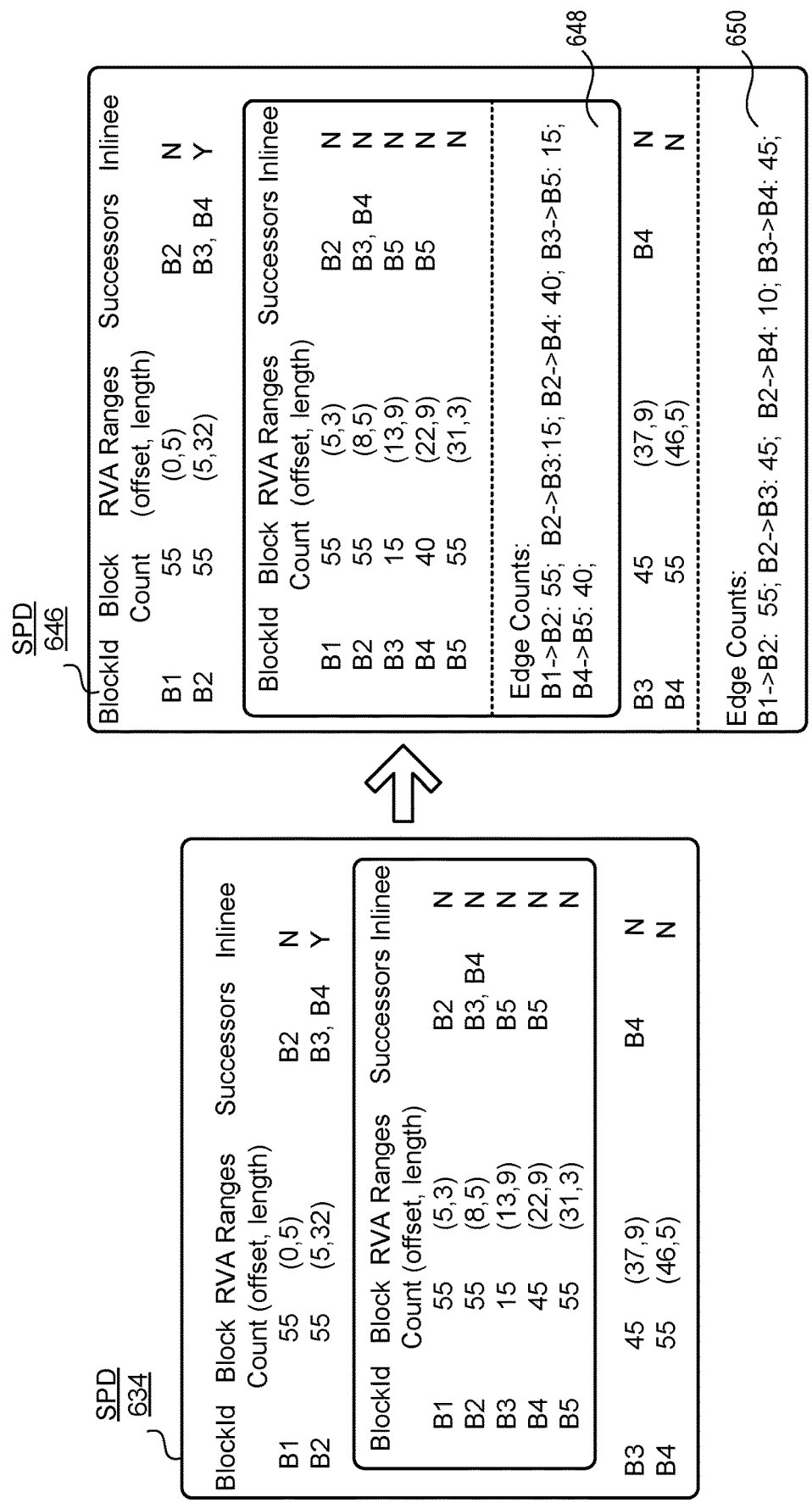

Turning to FIG. 6D, there is shown the SPD file 634 without edge counts and the corresponding SPD file 646 with edge counts. When the SPD converter 132 performs the post processing, the SPD converter 132 adds in the edge counts for each edge in each basic block of each control flow representation. As shown in SPD file 646, there are edge counts 648 for the control flow representation of foo( )'s inlined instance and edge counts 650 for the control flow representation of main( ). The edge counts 648 for foo( )'s inlined instance include an edge count of 55 for the edge B1→B2, an edge count of 15 for the edge B2→B3, an edge count of 40 for the edge B2→B4, an edge count of 15 for the edge B3→B5, and an edge count of 40 for the edge B4→B5. The edge counts 650 for main( ) include an edge count of 55 for the edge B1→B2, an edge count of 45 for the edge B2→B3, an edge count of 10 for the edge B2→B4, and an edge count of 45 for the edge B3→B4.

The generation of the SPD file in the manner described above has several advantages. A sampled instruction is not traced back to a particular source code line number or debug line number, rather it is traced back to the basic block that is associated with its intermediate code representation. In this manner, the block count considers instructions that are inlined and have relocated to different blocks of the program due to optimization thereby producing a more accurate block count. The mapping from a hardware instruction to a basic block is a direct mapping that utilizes only the RVA. Furthermore, since the block counts are part of the control flow representation of the program, it is easier for the compiler's optimizer to access them since the optimizer utilizes a control flow graph to perform most optimizations.

In accordance with aspects of the subject matter described herein, a computer system can include one or more processors, a memory connected to one or more processors, one or more compilers, a linker and a SPD converter. The one or more compilers include one or more modules that when loaded into the memory cause the one or more processors to compile and optimize a source code file and generate correlation data. The correlation data includes a control flow graph of the source code in the form of a control flow representation and a block-to-offset map. The control flow representation includes a plurality of basic blocks. The linker includes one or more modules that when loaded into the memory causes the one or more processors to link the optimized object files of a program into an image file and to replace the offsets in the block-to-offset map with a corresponding relative virtual address (RVA). The RVA is a relative address from a start address of the function associated with a basic block in the image file. The SPD converter includes one or more modules that when loaded into the memory causes the one or more processors to obtain sample data from sample runs which is converted into a SPT format and used to generate block and edge counts for each basic block of a function which is stored in a SPD file. Additional sample runs may be made and the sample data from those sample runs may be merged into the block and edge counts in the SPD file. The old block counts may be expired if older than a threshold or replaced with the new counts. A weight may be associated with the sample data based on a time the sample data was obtained and a weighted average of the counts may be used. At least one of the one or more compilers is a profile optimization compiler that utilizes the block and/or edge counts of the sample profile data to optimize the program.

A method of using a system such as the system described above can include operations such as obtaining sample data from execution of a program that includes a relative virtual address of a hardware instruction and a count of a number of times the hardware instruction has been executed. The relative virtual address of the hardware instruction is matched to a corresponding basic block of a source code control flow representation of the program. A block count associated with the matching basic block is updated to include the count and the block count, and its associated edge counts are used in the optimization of the program. Correlation data is generated during a compilation of the program to map the relative virtual address of the hardware instruction to its associated basic block. The correlation data also includes the control flow representation of the program including the basic blocks and a block-to-offset map. The block-to-offset map is converted into a block-to-RVA map based on a linked image of the program. Sample data from sample runs is obtained and converted into a format that includes the RVA and a count associated with the hardware instruction. The block count associated with a basic block considers each inlined function that is included in a basic block. The block counts may be updated with sample data from additional sample runs. These block counts may merged into the existing block counts and the merged block counts may be used to re-optimize the program. The program may be edited and re-optimized using the exiting block counts or the merged block counts.

A device can include one or more processors, a memory connected to at least one processor, and at least one module loaded into the memory causing the at least one processor to generate a control flow representation for at least one function of the program that includes at least one basic block having a range of virtual addresses associated with instructions that are part of a basic block and a block count. The at least one module obtains a hardware instruction including a virtual address and a count. The virtual address of the instruction sample is used to find a basic block of the control flow representation that is associated with the instruction sample. The block count associated with the matching basic block is updated. The program is optimized using the data from the control flow representation including the block counts.

Examples of Suitable Computing Environments

Figure 7:
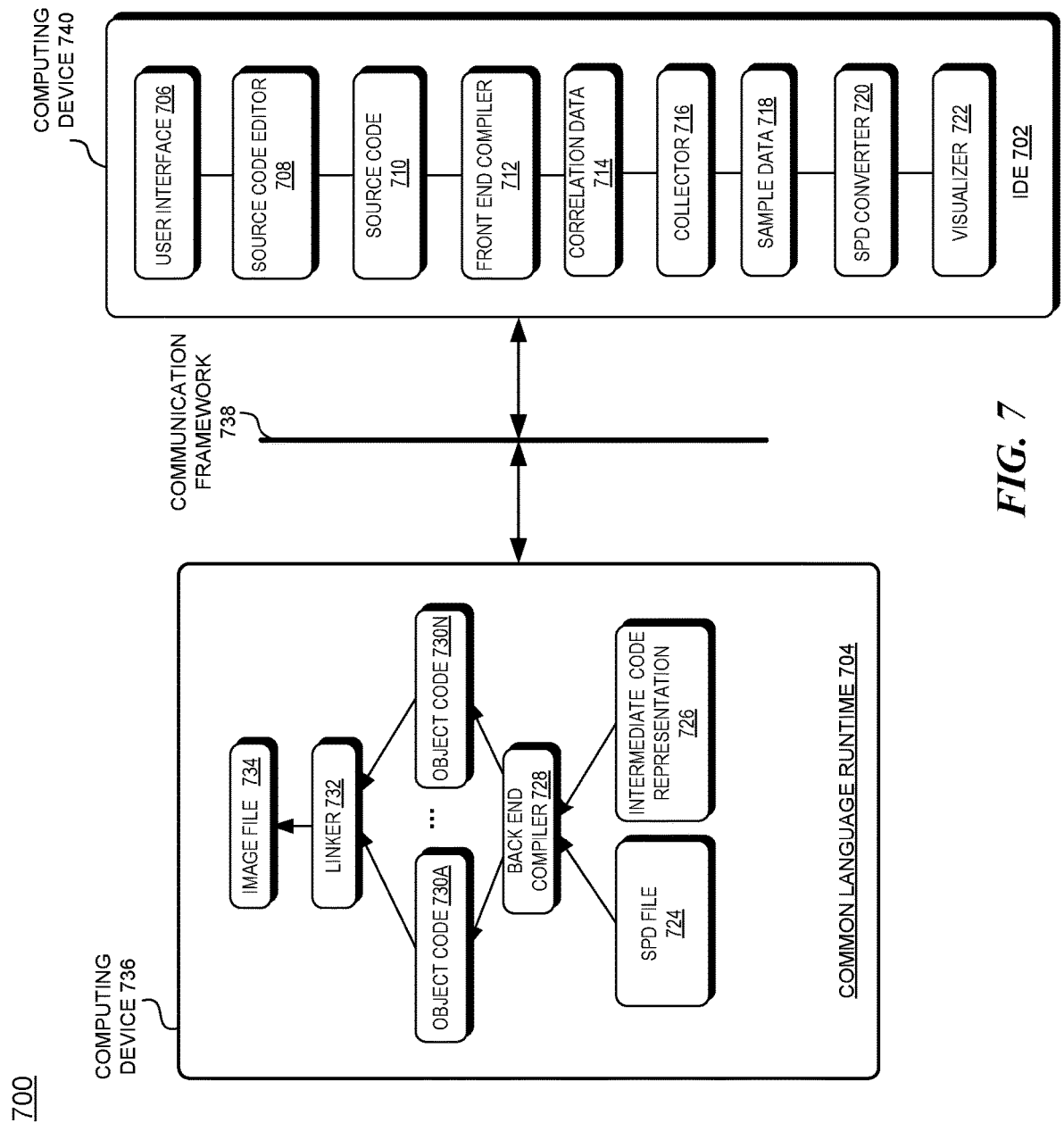
FIG. 7 is a block diagram illustrating a first exemplary computing or operating environment.

Attention now turns to a discussion of exemplary operating environments. FIG. 7 depicts a first exemplary operating environment 700 that includes an integrated development environment ("IDE") 702 and a common language runtime ("CLR") 704. The IDE 702 (e.g., Visual Studio, NetBeans, Eclipse, JetBrains, NetCode, etc.) may allow a user (e.g., developer, programmer, designer, coder, etc.) to design, code, compile, test, run, edit, debug or build a program, set of programs, web sites, web applications, packages, and web services in a computing device. Software programs include source code 710 created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like).

The IDE 702 may provide a native code development environment or may provide a managed code development that runs on a language virtual machine or may provide a combination thereof. The IDE 702 may provide a managed code development environment using the .NET framework that may include a user interface 706, a source code editor 708, a front-end compiler 712, a collector 716, a SPD converter 720, and a visualizer 722. A user can create and/or edit the source code according to known software programming techniques and the specific logical and syntactical rules associated with a particular source language via the user interface 706 and the source code editor 708 in the IDE 702. Thereafter, the source code 710 can be compiled via a front end compiler 712, whereby an intermediate code representation 726 of the program and correlation data 714 is created.

Additionally, the IDE 702 may generate SPD file 724 using a collector 716 that collects and aggregates sample data 718 from various sample runs of the program and a SPD converter 720 that generates block counts from the sample data into a SPD file 724 which can be viewed by a using through a visualizer 722. Object code or native code 730A-730N is created using a language specific compiler or back end compiler 728 from the intermediate code representation 726 and the SPD file 724 when the program is executed. That is, when an intermediate code representation 726 is executed, it is compiled and linked (linker 732) while being executed into the appropriate machine language for the platform it is being executed on, thereby making the image file 734 portable across several platforms. Alternatively, in other embodiments, programs may be compiled to native code machine language (not shown) appropriate for its intended platform.

In one aspect of the invention, the IDE 702 may operate on a first computing device 740 and the CLR 704 may operate on a second computing device 736 that is distinct from the first computing device 740. In another aspect of the invention, the IDE 702 and CLR 704 may operate on the same computing device. The computing devices 736, 740 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof.

The first and second computing devices 736, 740 may be communicatively coupled through a communication framework 738. The communication framework 738 facilitates communications between the computing devices. The communications framework 738 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

Although the foregoing operating environment has been described with respect to the .NET framework, the technology described herein is not constrained to any particular software framework, programming language, compiler collection, operating system, operating system platform, compiler infrastructure project, and the like. The techniques described herein can be employed in the GNU compiler collection (GCC) and the Low-Level Virtual Machine (LLVM) compiler infrastructure and other compiler and operating systems.

Figure 8:
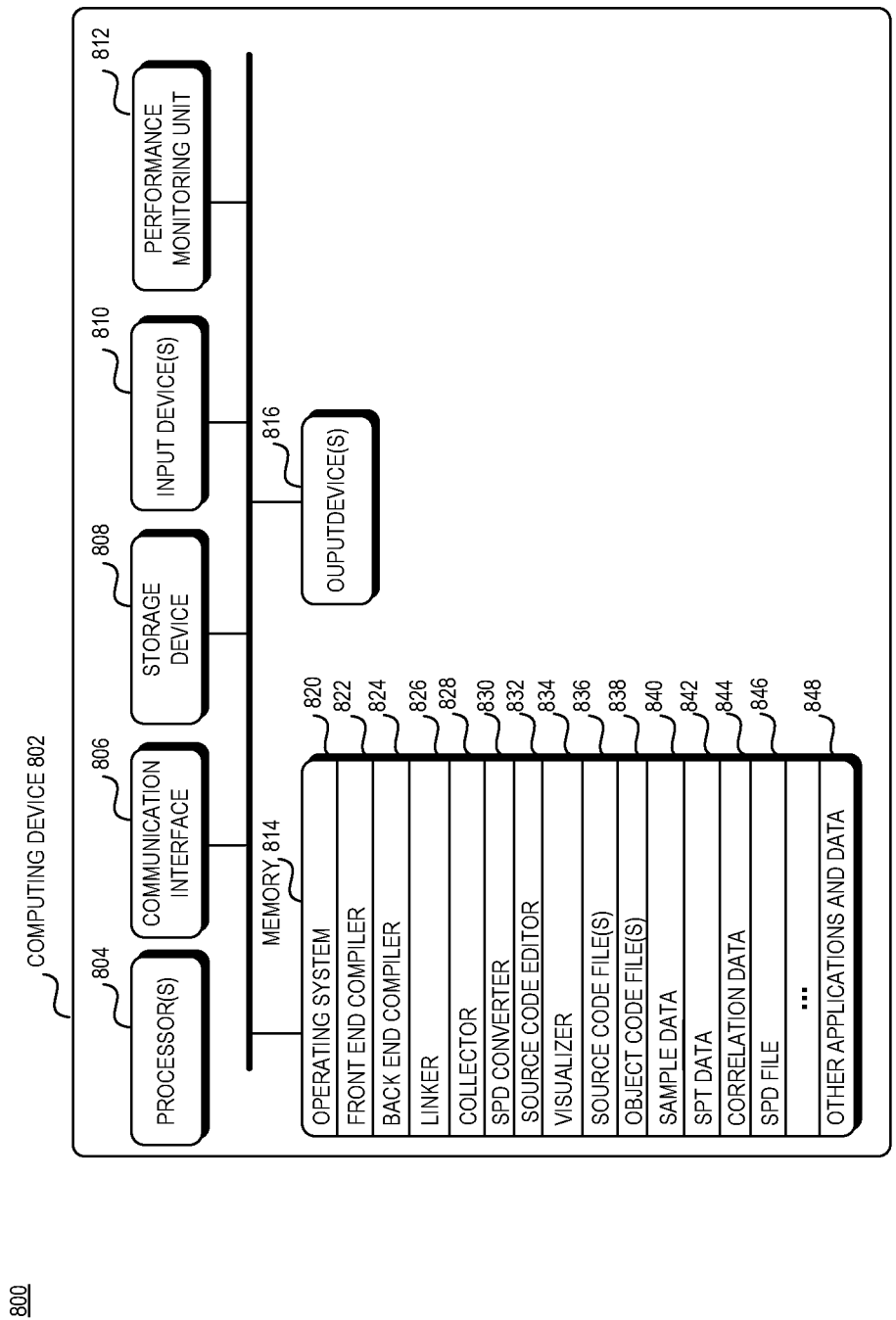
FIG. 8 is a block diagram illustrating a second exemplary computing or operating environment.

Attention now turns to FIG. 8 and a discussion of a second exemplary operating environment. It should be noted that the operating environment 800 is exemplary and is not intended to suggest any limitation as to the functionality of the embodiments. The embodiments may be applied to an operating environment 800 utilizing at least one computing device 802. The computing device 802 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 800 may be configured in a network environment, a distributed environment, a multi-processor environment, or a stand-alone computing device having access to remote or local storage devices.

The computing device 802 may include one or more processors 804, a communication interface 806, a storage device 808, one or more input devices 810, one or more performance monitoring units (PMU) 812, output devices 816, and a memory 814. A processor 804 may be any commercially available processor and may include dual microprocessors and multi-processor architectures. The communication interface 806 facilitates wired or wireless communications between the computing device 802 and other devices. The storage device 808 may be computer-readable medium that does not contain propagating signals, such as modulated data signals transmitted through a carrier wave. Examples of the storage device 808 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. The input devices 810 may include a keyboard, mouse, pen, voice input device, touch input device, etc., and any combination thereof. The output devices 816 may include a display, speakers, printers, etc., and any combination thereof. The PMU 812 includes a set of special purpose registers (e.g., hardware counters) that store counts of hardware-related activities and related hardware/software that reads these registers.

The memory 814 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. The memory 814 may also include one or more external storage devices or remotely located storage devices that do not pertain to propagated signals, such as modulated data signals transmitted through a carrier wave.

The memory 814 may contain instructions, components, and data. A component is a software program that perform a specific function and is otherwise known as a module, application, and the like. The memory may include an operating system 820, a front end compiler 822, a back end compiler 824, a linker 826, a collector 828, a SPD converter 830, a source code editor 832, a visualizer 834, source code files 836, object code files 838, sample data 840, SPT data 842, correlation data 844, SPD file 846, and various other applications, components, and data 848.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A device, comprising:
   at least one processor and a memory;
   wherein the at least one processor is configured to:
   generate a control flow representation for at least one function of a program prior to code optimization, the control flow representation including correlation data for at least one basic block, the correlation data including a range of relative virtual addresses and a block count, the range of relative virtual addresses associated with instructions that are part of the at least one basic block, the range of relative virtual addresses relative to a linked image of the program;
   obtain a hardware instruction sample including a relative virtual address and a count, wherein the hardware instruction sample is based on a version of the program after code optimization;
   find a basic block corresponding to the hardware instruction sample based on a matching relative virtual address, wherein the basic block is without relocated instructions;
   update a block count associated with the matching basic block with the count; and
   optimize the program code based on the block counts.

2. The device of claim 1,
   wherein the control flow representation of the matching basic block includes a control flow representation of an inlined function, and
   wherein the matching basic block is a basic block associated with the inlined function.

3. The device of claim 1, wherein the control flow representation of the function is based on an intermediate code representation.

4. The device of claim 1, wherein the relative virtual address is relative to a start of the function in a linked image of the program.

5. The device of claim 1, wherein the at least one processor is further configured to: edit the program and re-optimize the program using the control flow representation.

6. The device of claim 1, further comprising a performance monitoring unit, and
   wherein the hardware instruction sample is obtained from the performance monitoring unit.

7. A system, comprising:
   at least one processor and a memory;
   wherein the memory includes executable instructions that when executed on the at least one processor performs actions that:
   generates correlation data for a program, the correlation data including a control flow representation of the program before code optimization including one or more basic blocks, at least one basic block associated with at least one function of the program, the at least one basic block including a range of relative virtual addresses (RVA) corresponding to instructions of the at least one basic block, a relative virtual address based on an image file of the program;
   obtains sample trace data from an execution version of the program, the sample trace data including a RVA and a count for an executed instruction, the count representing a frequency of execution of an executed instruction associated with a corresponding RVA, wherein the execution version of the program contains optimized instructions;
   generates sample profile data (SPD) for the program using the sample trace data, the sample profile data including the correlation data and a block count for each basic block in the correlation data, the block count including counts from the sample trace data based on a matching RVA within a basic block with a RVA in the sample trace data, wherein the matching basic block is without relocated instructions; and
   optimizes the program code using the SPD.

8. The system of claim 7, wherein the memory includes further instructions that when executed on the at least one processor perform actions that:
   during a first compilation of the program, generating a block-to-offset map for the at least one basic block, the block-to-offset map including an offset for each instruction in the at least one basic block relative to the start of the function associated with the basic block.

9. The system of claim 8, wherein the memory includes further instructions that when executed on the at least one processor perform actions that:
   replaces the offset in the block-to-offset map with a corresponding RVA derived by a linker.

10. The system of claim 7, wherein the memory includes further instructions that when executed on the at least one processor perform actions that:
    obtains new sample data from additional sample runs and merges counts from the new sample data into existing block counts associated with a basic block.

11. The system of claim 7, wherein the memory includes further instructions that when executed on the at least one processor perform actions that:
    associates a weight to the sample data based on a time the sample data is obtained and computes a block count for a basic block based on a weighted average of counts from the sample data.

12. The system of claim 7, wherein the memory includes further instructions that when executed on the at least one processor perform actions that:
    obtains new sample data from additional sample runs and expires existing block counts.

13. The system of claim 7, wherein the memory includes further instructions that when executed on the at least one processor perform actions that:
    performs a second compilation of the program using the SPD to optimize the program.

14. A method, comprising:
    generating a control flow representation for at least one function of a program prior to code optimization, the control flow representation including correlation data for at least one basic block, the correlation data including a range of relative virtual addresses and a block count, the range of relative virtual addresses associated with instructions that are part of the at least one basic block, the range of relative virtual addresses relative to a linked image of the program;

obtaining a hardware instruction sample including a relative virtual address and a count, wherein the hardware instruction sample is based on a version of the program after code optimization;

finding a basic block corresponding to the hardware instruction sample based on a matching relative virtual address, wherein the basic block is without relocated instructions;

updating a block count associated with the matching basic block with the count; and optimizing the program code based on the block counts.

15. The method of claim 14, wherein the control flow representation of the matching basic block includes a control flow representation of an inlined function, and wherein the matching basic block is a basic block associated with the inlined function.

16. The method of claim 14, wherein the control flow representation of the function is based on an intermediate code representation.

17. The method of claim 14, wherein the relative virtual address is relative to a start of the function in a linked image of the program.

18. The method of claim 14, further comprising:

editing the program and re-optimizing the program using the control flow representation.

19. The method of claim 14, further comprising obtaining the hardware instruction sample from a performance monitoring unit.

* * * * *